(12) United States Patent
Nilsson (10) Patent No.: US 9,225,994 B2
(45) Date of Patent: Dec. 29, 2015

(54) GLOBAL MOTION ESTIMATION USING REDUCED FRAME LINES

(75) Inventor: Michael E Nilsson, Ipswich (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 1569 days.

(21) Appl. No.: 11/884,460

(22) PCT Filed: Feb. 3, 2006

(86) PCT No.: PCT/GB2006/000377
§ 371 (c)(1),
(2), (4) Date: Aug. 16, 2007

(87) PCT Pub. No.: WO2006/097673
PCT Pub. Date: Sep. 21, 2006

(65) Prior Publication Data
US 2008/0107179 A1 May 8, 2008

(30) Foreign Application Priority Data

Mar. 14, 2005 (EP) .................................... 05251527

(51) Int. Cl.
*H04N 19/537* (2014.01)
*H04N 19/527* (2014.01)
(Continued)

(52) U.S. Cl.
CPC ........... *H04N 19/537* (2014.11); *H04N 19/527* (2014.11); *H04N 19/533* (2014.11); *H04N 5/145* (2013.01); *H04N 19/543* (2014.11); *H04N 19/593* (2014.11)

(58) Field of Classification Search
CPC ............ H04N 19/00593; H04N 5/145; H04N 19/593; H04N 19/527; H04N 19/533; H04N 19/537; H04N 19/543
USPC ..................................................... 375/240.16
See application file for complete search history.

(56) References Cited

U.S. PATENT DOCUMENTS 4,218,703 A    8/1980   Netravali et al.
5,386,248 A *   1/1995   De Haan et al. ............... 348/699
(Continued)

FOREIGN PATENT DOCUMENTS

WO    WO 2004049721 A1 *   6/2004

OTHER PUBLICATIONS

Adolph D. et al., "1.15 Mbit/s coding of video signals including global motion compensaion," Signal Processing Image Communication, Elsevier Science Publishers Amsterdam, NL, vol. 3, No. 2/3, Jun. 1, 1991, pp. 259-274.
(Continued)

*Primary Examiner* — Theodore Parsons
(74) *Attorney, Agent, or Firm* — Nixon & Vanderhye PC (57) ABSTRACT

A global motion vector for a first video frame identifies a shift that, when applied to second video frame, increases the similarity between the two frames. A method comprises: selecting picture elements from the first frame; comparing the selected picture elements with correspondingly positioned picture elements of the second video frame to produce a measure of similarity corresponding to zero shift; comparing, for each of a plurality of trial shifts, the selected picture elements with picture elements of the second video frame that have the same mutual positions but shifted by the respective trial shift, to produce a measure of similarity in respect of that trial shift; identifying the trial or zero shift which gives rise to the highest measure of similarity; and estimating a global motion vector from the identified shift. The selected picture elements are less than 5% of the total number of lines in the frame.

16 Claims, 5 Drawing Sheets

(51) Int. Cl.
*H04N 19/533* (2014.01)
*H04N 5/14* (2006.01)
*H04N 19/543* (2014.01)
*H04N 19/593* (2014.01)

(56) References Cited

U.S. PATENT DOCUMENTS

| | | | | |
|---|---|---|---|---|
| 5,473,379 | A | * | 12/1995 | Horne ..................... 375/240.16 |
| 5,682,205 | A | * | 10/1997 | Sezan et al. ................... 348/452 |
| 5,801,778 | A | * | 9/1998 | Ju .......................... 375/240.15 |
| 5,832,101 | A | * | 11/1998 | Hwang et al. ................. 382/107 |
| 5,995,154 | A | * | 11/1999 | Heimburger ................. 348/448 |
| 6,285,711 | B1 | * | 9/2001 | Ratakonda et al. ...... 375/240.16 |
| 6,360,015 | B1 | | 3/2002 | Bakhmutsky et al. |
| 6,385,245 | B1 | | 5/2002 | De Haan et al. |
| 6,574,370 | B1 | * | 6/2003 | Kazayama et al. ........... 382/236 |
| 6,925,121 | B1 | * | 8/2005 | Komiya et al. .......... 375/240.16 |
| 7,346,109 | B2 | * | 3/2008 | Nair et al. ................ 375/240.16 |
| 7,457,483 | B2 | * | 11/2008 | Tokiwa ........................ 382/298 |
| 7,551,673 | B1 | * | 6/2009 | Oh et al. .................. 375/240.16 |
| 2002/0012459 | A1 | | 1/2002 | Oh |
| 2002/0054642 | A1 | * | 5/2002 | Ma et al. .................. 375/240.16 |
| 2003/0118104 | A1 | | 6/2003 | Zaccarin |
| 2004/0013199 | A1 | * | 1/2004 | Winger et al. ........... 375/240.16 |
| 2004/0101047 | A1 | * | 5/2004 | Yang .......................... 375/240.08 |
| 2004/0109503 | A1 | * | 6/2004 | Lee ........................... 375/240.16 |
| 2004/0160529 | A1 | * | 8/2004 | Nagakura et al. ............. 348/452 |
| 2005/0243928 | A1 | * | 11/2005 | Hubrich et al. .......... 375/240.16 |
| 2006/0072664 | A1 | * | 4/2006 | Kwon et al. ............. 375/240.16 |
| 2006/0078048 | A1 | * | 4/2006 | Bjontegaard ............ 375/240.03 |
| 2010/0045818 | A1 | * | 2/2010 | Kondo et al. ............... 348/222.1 |

OTHER PUBLICATIONS

Jozawa, Hirohisa, et al., "Two-Stage Motion Compensation Using Adaptive Global MC and Local Affine MC", IEEE Trans. on Circuits and Systems for Video Technology, vol. 7, No. 1 Feb. 1997, pp. 75-85.

Morimoto, C. et al., "Video coding using hybrid motion compensation," Proceedings, International Conference on Image Processing, 1997, vol. 1, pp. 89-92.

Osako F. et al., "A Dynamic Computation Resource Scalable Algorithm for Software Video Codec," NTG Fachberichte, VDE Verlag, Berlin, DE, vol. 143, Sep. 10, 1997, pp. 515-518, ISN: 0341-0196.

Tham, J.Y., et al., "A novel unrestricted center-biased diamond search algorithm for block motion estimation," IEEE Tran. Circuits Syst. Video Technol., vol. 8, No. 4, pp. 369-377, Aug. 1998.

Sarnel H., "An extended 1-D phase correlation algorithm for image registration," Proceedings of the IEEE-EURASIP Workshop on Nonlinear Signal and Image Processing (NSIP'99), Jun. 20-23, 1999, Bogazici Univ. pp. 219-13, vol. 1, http://sss.info.bt.co.uk/cgi-bin/ferret/inspec_show_tpl/inspec?d=1427209&q=phase%20correlation.

Suzuki Y. et al, "On/Off decision of global and local motion compensation in low-bit-rate video coding," Proceedings of the 6$^{th}$ International Conference on Image Processing (ICIP'99), Oct. 24-28, 1999, IEEE, pp. 99-103, vol. 1.

Dufaux, F. et al., "Efficient, robust, and fast global motion estimation for video coding," IEEE Transactions on Image Processing, vol. 9, Issue 3 (Mar. 2000), pp. 497-501.

Sarnel, H., "A robust cepstrum-based algorithm for image registration using projections," IEEE 2002 6$^{th}$ International Conference on Signal Processing, Aug. 26-30, 2002, vol. 1, pp. 813-816.

Sun, Shijun et al., "Efficient motion estimation using global motion predictor," Proceedings of the Fifth IASTED International Conference on Signal and Image Processing ACTA Press Anaheim, CA, USA, 2003, pp. 177-182, ISBN: 0-88986-378-4.

Chen, Thou-Ho et al., "A novel flatted hexagon search pattern for fast block motion estimation, "Image Processing 2004, ICIP '04 International Conference on Singapore Oct. 24-27, 2004, Piscataway, NJ, USA, IEEE, vol. 3, Oct. 24, 2004, pp. 1477-1480, ISBN: 0-7803-8554-3.

Tourapis, A et al., Predictive Motion Vector Field Adaptive Search Technique (PMVFAST). Dept. of Electrical Engineering, The Hong Kong University of Science and Technology, available online at: http://www.softlab.ntua.gr/~tourapis/papers/4310-92.pdf.

* cited by examiner

GLOBAL MOTION ESTIMATION USING REDUCED FRAME LINES

This application is the US national phase of international application PCT/GB2006/000377 filed 3 Feb. 2006 which designated the U.S. and claims benefit of EP 05251527.7, dated 14 Mar. 2005, the entire content of which is hereby incorporated by reference.

The present invention concerns motion estimation, particularly, though not exclusively, in the context of video coders employing inter-frame differential coding.

BACKGROUND AND SUMMARY

Figure 1:
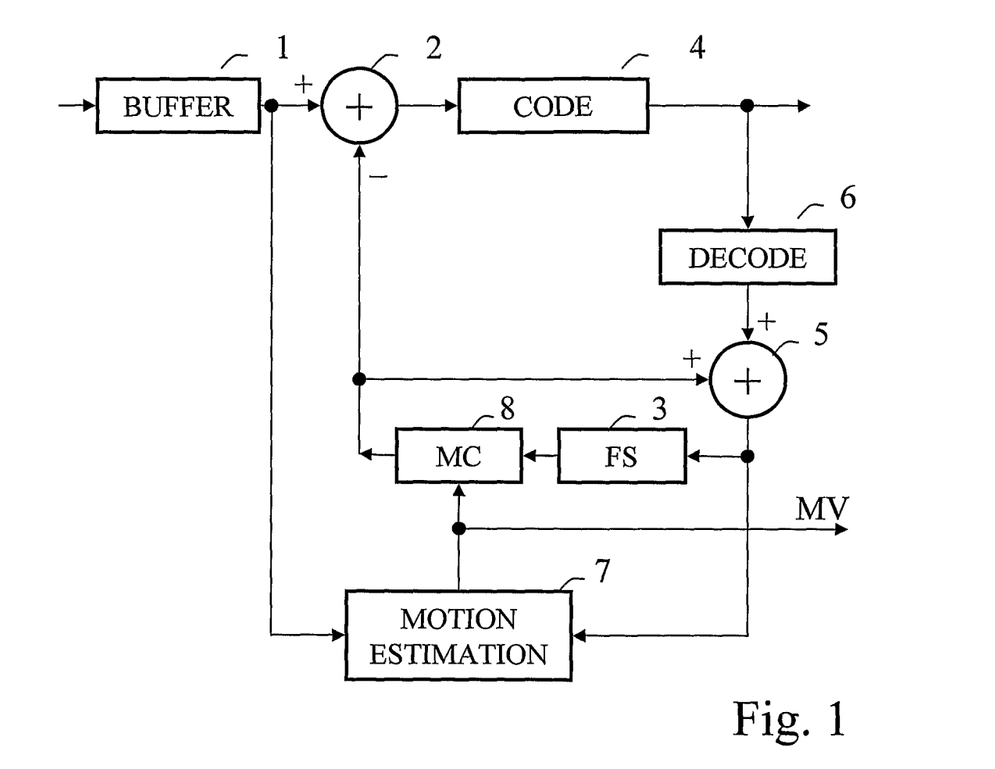
FIG. 1 is a block diagram of a known form of video coder.

FIG. 1 shows a known form of video coder. Video signals (commonly in digital form) are received by an input buffer 1. A subtractor 2 forms the difference between the input and a predicted signal from a frame store 3 which is then further coded in box 4. The coding performed here is not material to the present invention, but may include thresholding (to suppress transmission of zero or minor differences) quantisation or transform coding for example. The input to the frame store is the sum, formed in an adder 5, of the prediction and the coded difference signal decoded in a local decoder 6 (so that loss of information in the coding and decoding process is included in the predictor loop).

The differential coding is essentially inter-frame, and the prediction could simply consist of a one-frame delay provided by the frame store 3; as shown however a motion estimator 7 is also included. This compares the frame of the picture being coded with the previous frame being supplied to the predictor. For each block of the current frame (into which the picture is regarded as divided) it identifies that region of the previous frame which the block most closely resembles. The vector difference in position between the identified region and the block in question is termed a motion vector (since it usually represents motion of an object within the scene depicted by the television picture) and is applied to a motion compensation unit 8 which serves to shift the identified region of the previous frame into the position of the relevant block in the current frame, thereby producing a better prediction. This results in the differences formed by the subtractor 2 being, on average, smaller and permits the coder 4 to encode the picture using a lower bit rate than would otherwise be the case. The motion vector is sent to a decoder along with the coded difference signal from 4.

The motion estimator must typically compare each block with the corresponding block of the previous frame and regions positionally shifted from that block position; in practical systems, this search is limited to a defined search area rather than being conducted over the entire frame, but even so it involves a considerable amount of processing and often necessitates many accesses to stored versions of both frames. Note that this requires that the input buffer 1 introduces sufficient delay that the motion estimator 7 has access to the current block and its search area to complete its motion estimation for that block before it arrives at the subtractor 2.

Figure 2:
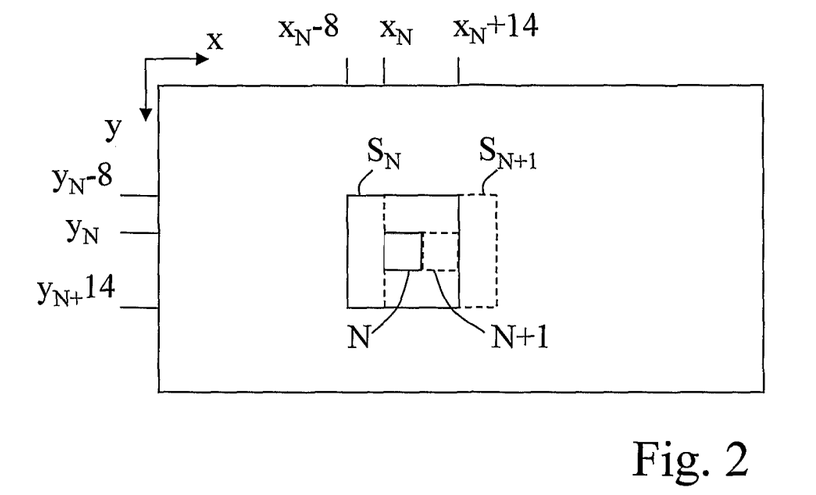
FIG. 2 is a diagram of a television picture showing a co-ordinate system and a search area used by the motion estimators of FIG. 1.

Usually the motion estimator regards a "current" frame of a television picture which is being coded as being divided into 8×8 blocks—that is, eight picture elements (pixels) horizontally by eight lines vertically. Although the principles are equally applicable to interlaced systems, for simplicity of description a non-interlaced picture is assumed. It is designed to generate for each block a motion vector which indicates the position of the 8×8 region, lying within a defined search area of the (or a) previous frame of the picture, which is most similar to the block in question. FIG. 2 illustrates a field with an 8×8 block N (shaded) and a typical associated 23×23 search area indicated by a rectangle $S_N$. If the pixels horizontally and lines vertically are identified by co-ordinates x, y, with an origin at the top left-hand corner, then the search area for a block whose upper left hand corner pixel has co-ordinates $x_N, y_N$ is the area extending horizontally from $(x_N-8)$ to $(x_N+14)$ and vertically from $(y_N-8)$ to $(y_N+14)$.

In order to obtain the motion vector it is necessary to conduct a search in which the block is compared with each of the 256 possible 8×8 regions of the previous frame lying within the search area—i.e. those whose upper left pixel has co-ordinates $x_N+u$, $y_N+V$ where u and v are in the range −8 to +7. The motion vector is the values of u,v for which the comparison indicates the greatest similarity. The test for similarity can be any conventionally used—e.g. the sum of the absolute values of the differences between each of the pixels in the "current" block and the relevant region of the previous frame.

As this is computationally intensive, one known approach (see, for example, J. Y. Tham, S. Ranganath, M. Ranganath, and A. A. Kassim, "A novel unrestricted center-biased diamond search algorithm for block motion estimation", IEEE Trans. Circuits Syst. Video Technol., vol. 8, no. 4, pp. 369-377, August 1998) is to make an initial estimate of the motion vector, and use this to define the position of an offset search area. This search area can then be smaller and the search can be performed more quickly. One such method involves an iterative approach in which this search area consist of just five positions—i.e. the positions, relative to the estimated offset position, of (0,0), (−1,0), (1,0), (0,−1) and (0,1). An updated estimate is the position represented by that one of these five positions that gives the smallest value of E. This is then repeated as necessary until no further improvement is obtained—i.e. relative position (0,0) gives the smallest E.

Chen and Li, "A Novel Flatted Hexagon Search Pattern for Fast Block Motion Estimation", 2004 International Conference on Image Processing (ICIP), IEEE, vol. 3, pp. 1477-1480, notes that the probability of horizontally-biased motion is greater than that of vertically-biased motion and seeks to improve searching speed by selecting a search area in the shape of a flattened hexagon.

Possible options for the initial estimate include:
the motion vector already generated for the correspondingly positioned block of the preceding (or a preceding) frame;
the motion vector already generated for the block immediately above the block under consideration;
the motion vector already generated for the block immediately to the left of the block under consideration.

One useful method (Tourapis, A. et al. Predictive Motion Vector Field Adaptive Search Technique (PMVFAST). Dept. of Electrical Engineering, The Hong Kong University of Science and Technology, available online at: http://www.soft-lab.ntua.gr/~tourapis/papers/4310-92.pdf) involves using all three, and (0,0) and choosing the one that gives the lowest E, and using the chosen one as the starting point for the iteration.

Some proposals introduce the idea of a global motion vector—that is, a vector that identifies a single shift that when applied to the whole frame of a television picture produces a good prediction. See, for example, Hirohisa Jozawa, Kazuto Kamikura, Atsushi Sagata, Hiroshi Kotera, and Hiroshi Watanabe, "Two-Stage Motion Compensation Using Adaptive Global MC and Local Affine MC", IEEE Trans. on Circuits and Systems for Video Technology, Vol. 7, No. 1 Feb. 1997, pp. 75-85. Again, the global vector can provide the starting point for a search for a better vector. Winger (US2004/0013199A) obtains two global motion estimates, which he uses to provide the initial offsets for two simultaneous searches.

Sun and Lei, in "Efficient Motion estimation using Global Motion Predictor",

Proceedings of the Fifth lasted International Conference of Signal and Image Processing, 2003, pp. 177-182, propose a method of global motion estimation in which the amount of computation is reduced by considering only subregions of the image in the vicinity of the frame boundaries, amounting to roughly 5% of the frame.

BRIEF DESCRIPTION OF THE DRAWINGS

According to the present invention there is provided a method of estimating for a first video frame a global motion vector that identifies a shift that when applied to another frame of a television picture increases the similarity between them, comprising:
selecting picture elements from the first frame;
comparing the selected picture elements with correspondingly positioned picture elements of the other frame to produce a measure of similarity in respect of zero shift;
comparing, for each of a plurality of trial shifts, the selected picture elements with picture elements of the other frame that have the same mutual positions but shifted by the respective shift, to produce a measure of similarity in respect of that shift;
identifying that shift (or zero) which gives rise to a measure indicative of high similarity; characterised in that the number of selected picture elements is in the range of 0.1% to 5% of the total number of picture elements in the frame.

Other aspects of the invention are defined in the claims.

One embodiment of the invention winnow be described, by way of example, with reference to the accompanying drawings, in which.

DETAILED DESCRIPTION OF PRESENT EXAMPLE EMBODIMENTS

The video coder now to be described has the same structure as shown in FIG. 1. The operation of the coder is conventional except for the motion estimator 7, which will now be described.

Figure 3:
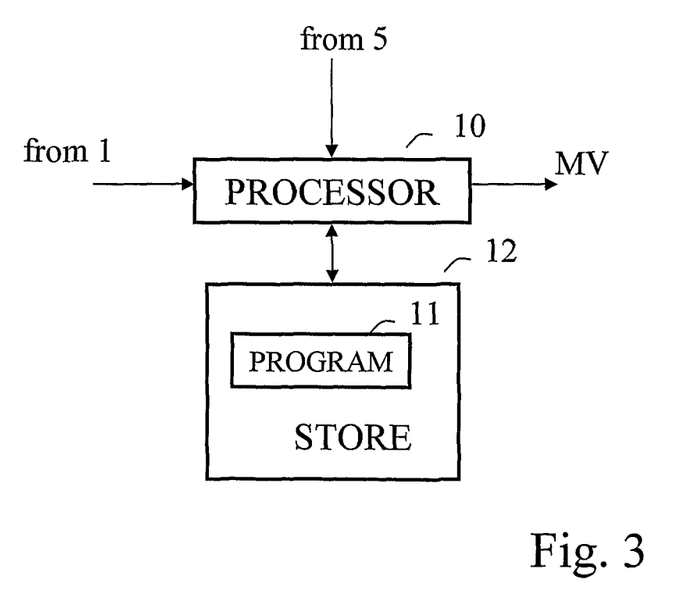
FIG. 3 is a block diagram of a motion estimator as used in one embodiment of the present invention.

As shown in FIG. 3, the function of the motion estimator is performed by a processor 10, controlled by a program 11 stored in memory 12. The processor has access to "previous frame" pixels stored in the frame store 3 and pixels of the current frame that is being coded, stored in the buffer 1. Its task is to generate a motion vector for each 8×8 block of the current frame. Of course, the algorithm can easily be adapted for other block sizes. In fact, in H.264, motion vectors can be encoded for various block sizes: 16×16, 16×8, 8×16, 8×8, 8×4, 4×8 and 4×4. One interesting approach is to perform motion estimation for more than one block size, and choose the vector that gives the best result. Note that, although the SOAD for a 16×16 block will never be better than the sum of the four SOADs obtained when it is divided into four 8×8 blocks, it may show to be superior once due allowance has been made for the different overhead data that needs to be sent.

The operation of the processor for one 8×8 block will now be explained with the aid of the flowchart of FIG. 4.

In Step 100 the system obtains a global motion vector for the current frame, relative to the previous frame or some other reference frame; or, if desired, more than one global motion vector may be obtained In Step 101 the system calculates further candidates for the current block, as discussed above;

In Step 102 each of these candidates, and the null vector (0,0) is evaluated and the vector is chosen that gave the best SOAD At Step 103 the chosen vector is iterated using the known procedure described earlier. The process then returns to Step 101 to deal with another block.

Figure 5A:
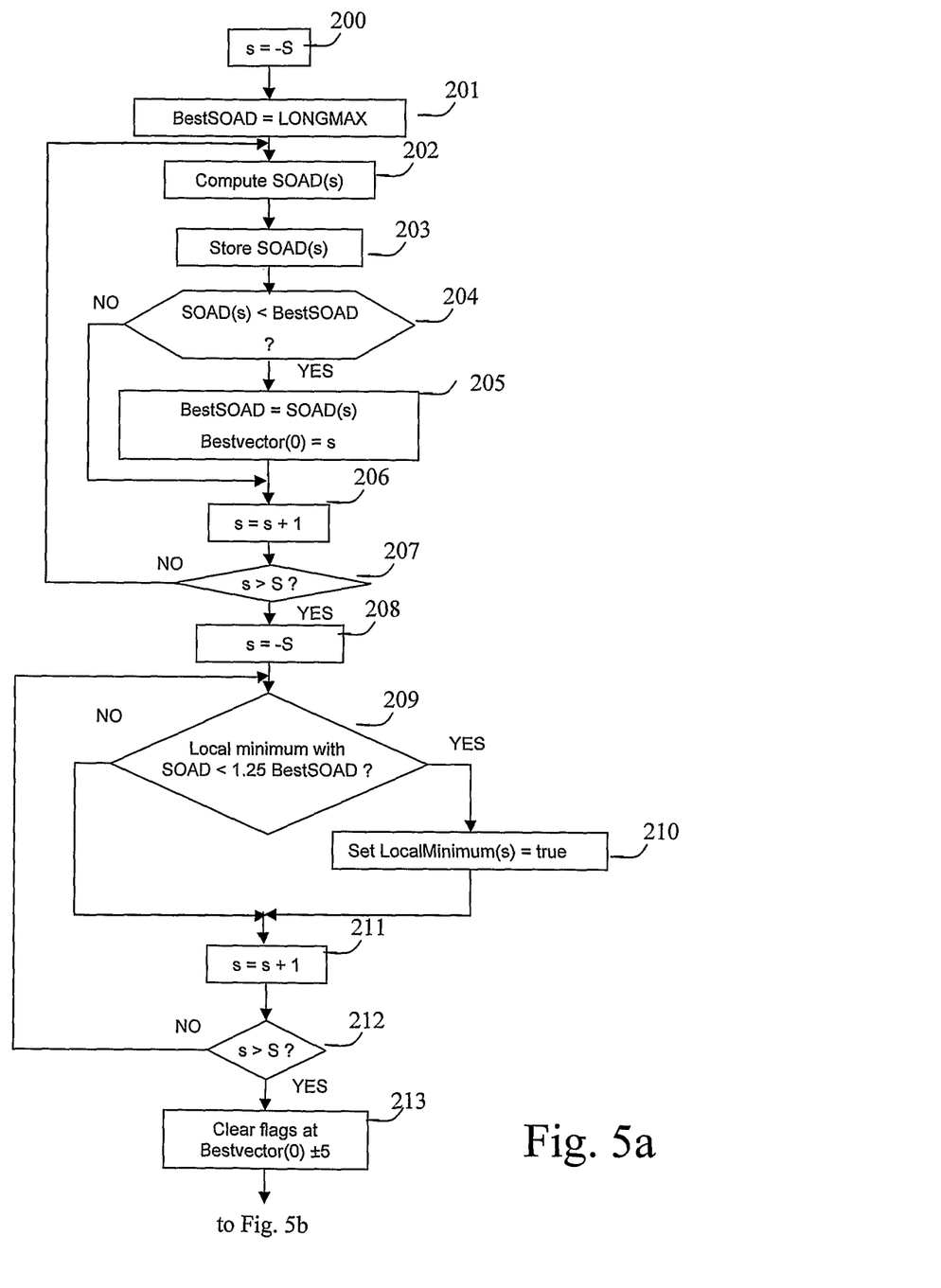
Figure 5B:
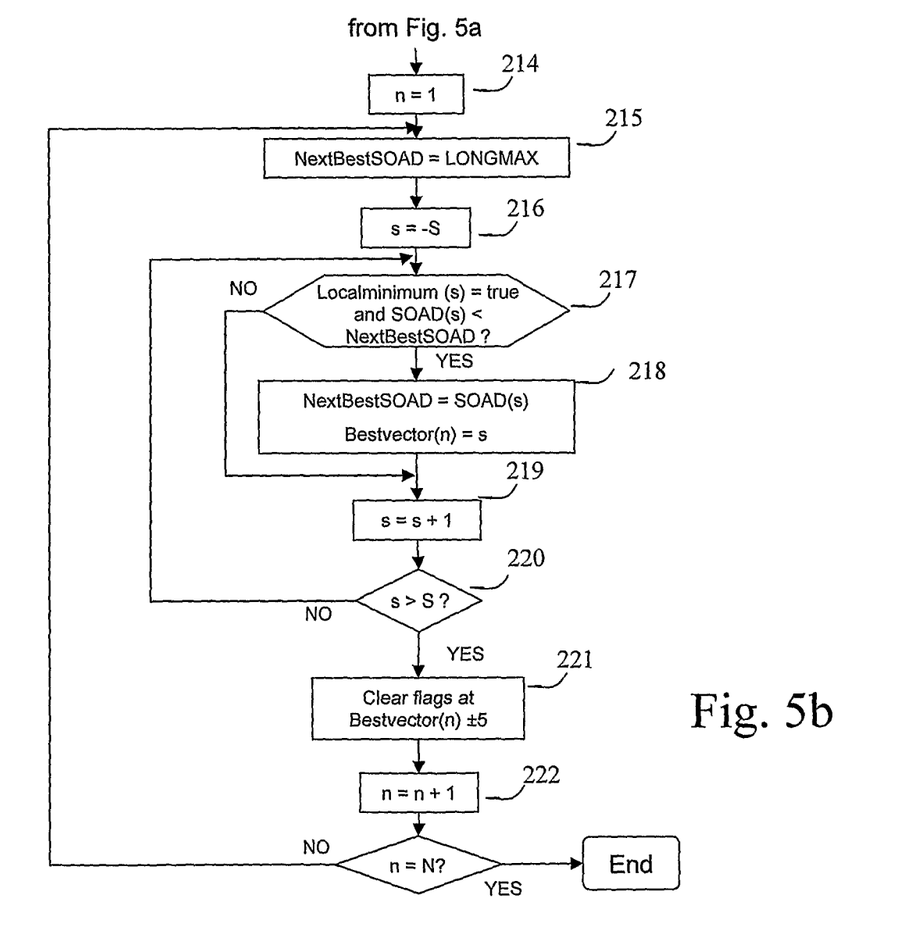

FIG. 5 shows a flowchart showing in detail the global motion vector derivation of Step 100. The method to be described is found to give improved results in cases of rapid motion. The problem with rapid motion is that it can result in the correct motion vector being large—so large in fact that the search extent offered by conventional methods is insufficient to find it. Simply increasing the size of the search area is not a satisfactory solution, since the amount of computation soon becomes unmanageably large, and slow. The present method aims to provide a large search extent (at least in the horizontal direction) and mitigates the increase in computation that would occur by limiting the comparison process to a small minority of the picture elements of the frame under consideration. The number of elements selected may be as low as of 0.1% to 5% of the total number of picture elements in the frame.

We prefer to take the picture elements from a relatively small number of lines, typically selecting the majority of elements in each selected line. In this example, the selected picture elements are a central section taken from each of three lines of the picture. The exact location of these lines is not critical: we choose them so that they divide the frame into four equal parts; thus if the frame contains 288 lines numbered 1 to 288, then we choose lines 72, 144 and 216.

The number of picture elements selected from each of these lines is roughly 50% of the total number of elements in the line; we find it convenient to use fixed numbers to cover a range of frame sizes. Typical figures (with search extent also given) are:

| | |
|---|---|
| 176 ≤ width < 320 | line length = 128; search extent = 24 |
| 320 ≤ width < 640 | line length = 224; search extent = 48 |
| 640 ≤ width | line length = 384; search extent = 128. |

Thus with a width of 352 picture elements numbered 1 to 352 the selected picture elements would be 65 to 288.

The reason for selecting the picture elements to be on a small number of lines, rather than scattered over the image, is that it allows efficient use of the processor cache, as the same limited set of picture elements is used as the search window is displaced. Also, where contiguous pixels along the line are used, it is possible to make use of SSE2 (and similar) single-instruction multiple data processor instructions that allow eight SOADS to be calculated simultaneously.

In this example, the motion vector sought is horizontal, its vertical component being zero. we consider values of the vector from −S to +S, where S is the search extent just mentioned.

Referring to the flowchart, at Step 200 the motion vector horizontal component s is set to −S. A variable BestSOAD is set to any large number large enough to be always greater than any real value of SOAD: in our implementation, we used a constant LONGMAX (=2147483647). At Step 202, a measure of similarity between the selected picture elements of the current frame and the picture elements within the reference frame that have the same positions but shifted by s is calculated. In this example it is the sum of absolute differences (SOAD). For the case where the selected picture elements are elements 65 to 288 of lines 72, 144 and 216, if the luminance for pixel P on line L of the current frame is Y(P,L) and that in the reference frame is R(P,L), this is $$SOAD(s) = \sum_{P=65}^{288} \{|Y(P, 72) - R(P + s, 72)| +$$
$$|Y(P, 144) - R(P + s, 144)| + |Y(P, 216) - R(P + s, 216)|\}$$

This value is stored (203) for later use along with the corresponding value of s; at Step 204 it is compared with BestSOAD. If the new value is lower, then at Step 205 BestSOAD is set to this new value and Bestvector(0) is set to the current value of s. Then, at step 206 s is incremented. If it does not exceed S, the process returns to Step 202 to calculate another SOAD.

Once all have been calculated, Bestvector contains the wanted result, the horizontal component of the global motion vector. In this example however, we choose also to identify up to N values of s that correspond to local minima of SOAD (considered as a function of s), as additional candidates. We however exclude the selection of any s which is within only a few pixels of one already chosen, or which has a value of SOAD more than 125% of the lowest found. Thus, the process next enters a further loop. At 208, the motion vector horizontal component s is again initialised to −S.

At 209 this values of s is checked for a local minimum and if found, subject to the 125% limit, a flag Localminimum(s) is set to True at 210. The condition for this is:

{[s=−S and SOAD(s)<SOAD(s+1)] or
[s=S and SOAD(s)<SOAD(s−1)] or
[−S<s<S and SOAD(s)<SOAD(s+1) and SOAD(s)<SOAD(s−1)]}
and SOAD(s)<1.25*BestSOAD.

Then, at step 211 s is incremented. If (212) it does not exceed S, the process returns to Step 209 to check another value and set the flag appropriately.

Having flagged the local minima, then at Step 213, any lying at, or within ±5 picture elements of, Bestvector are removed by setting Localminimum( ) to false for these positions.

A counter n, for finding up to N−1 further vectors, is set to 1 at Step 214, and NextbestSOAD is (215) initialised to a high value. Then a loop is entered which compares the SOAD of each local minimum with a running best value (NextbestSOAD).

More particularly:

At 216, the motion vector horizontal component s is again initialised to −S;

At 217, it is checked whether there is a local minimum flagged at this value of s that has a SOAD better (i.e. less) than the running value NextbestSOAD; if so, then at step 218 Bestvector (n) is set to s and NextbestSOAD is set to the new, lower SOAD just found.

At 219 s is incremented and if (220) it has not exceeded S then the search continues from 217.

At 221, any the local minima lying at or within ±5 picture elements of Bestvector(n) are removed by setting Localminimum( ) to false for these positions. Then n is incremented (222) and if it has not reached N the process returns to Step 215 to search for the best local minimum of those that still remain.

Figure 4:
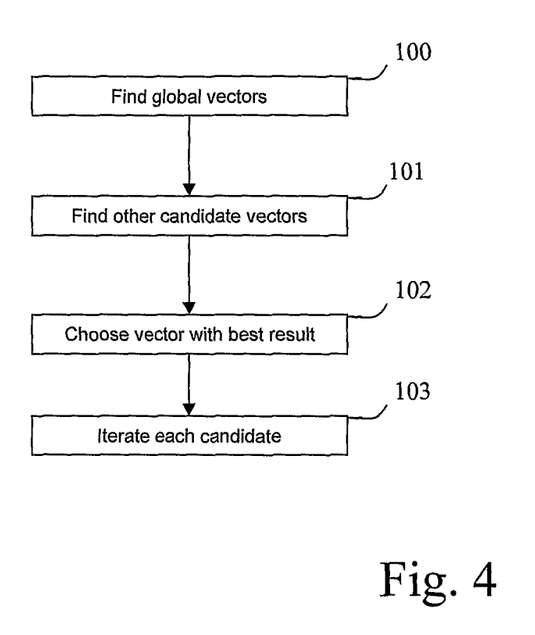
FIGS. 4 and 5 are flowcharts showing the operation of the motion estimator of FIG. 3.

At the conclusion of the process shown in FIG. 5, the N best global motion vectors are stored in Bestvector(0) to Bestvector(N−1) inclusive, ready to be utilised in Step 101 of FIG. 4. This process also contains provision to terminate it early in the event that there are in fact fewer than N elements meeting the criteria given in box 217, but, for clarity, these are not shown.

The invention claimed is:

1. A method of estimating a global motion vector for a first video frame of a video sequence comprising at least a first and a second video frame, wherein said global motion vector identifies a shift that when applied to a second video frame increases the similarity between the first and second video frames, the method comprising:
   selecting pixels directly from the first video frame;
   comparing the selected pixels with correspondingly positioned pixels of the second video frame to produce a measure of similarity corresponding to zero shift;
   comparing, for each of a plurality of trial shifts, the selected pixels with pixels of the second video frame that have the same mutual positions but shifted by the respective trial shift, to produce a measure of similarity in respect of that trial shift;
   identifying the trial or zero shift which gives rise to the highest measure of similarity; and
   estimating, using a computer processor, the global motion vector from the identified shift; wherein
   the selected pixels are selected only from selected individual lines of pixels from the first video frame and comprise a set of contiguous pixels taken from a portion of each selected individual line of pixels, the number of selected individual lines being less than 5% of the total number of lines in the frame; and
   the identified shift is one that gives rise to the highest sum of the measures of similarity for each of the selected individual lines;
   wherein each selected individual line of pixels separates parts of the first video frame containing non-selected lines on which trial shifts are not performed.

2. A method according to claim 1 in which the number of selected individual lines is fewer than five.

3. A method according to claim 2 in which the number of selected individual lines is 3.

4. A method according to claim 1 in which the majority of the trial shifts have a larger horizontal component than vertical component.

5. A method according to claim 4 in which the vertical component is zero.

6. A method according to claim 1 including identifying the shift that produces the measure indicative of the greatest similarity and at least one other shift that corresponds to a local maximum of similarity as indicated by the measure.

7. A method according to claim 1, wherein the selected individual lines of pixels of the first video frame divide the first video frame into equal parts.

8. A machine configured to estimate a global motion vector for a first video frame of a video sequence comprising at least a first and a second video frame, wherein said global motion vector identifies a shift that when applied to a second video frame increases the similarity between the first and second video, frames, the machine comprising:
- a non-transitory computer-readable storage medium storing instructions;
- a computer processor, configured to execute the instructions so as to:
  - select pixels directly from the first video frame so that the selected pixels are selected only from selected individual lines of pixels of the first video frame and comprise a set of contiguous pixels taken from a portion of each selected individual line of pixels and the number of selected individual lines is less than 5% of the total number of lines in the first video frame;
  - compare the selected pixels with correspondingly positioned pixels of the second video frame to produce a measure of similarity corresponding to zero shift;
  - compare, for each of a plurality of trial shifts, the selected pixels with pixels of the second video frame that have the same mutual positions but shifted by the respective trial shift, to produce a measure of similarity in respect of that trial shift;
  - identify the trial or zero shift that gives rise to the highest measure of similarity; and
  - estimate the global motion vector from the identified shift;
  - wherein the identified shift is one that gives rise to the highest sum of the measures of similarity for each of the selected individual lines; and
  - wherein each selected individual line of pixels separates parts of the first video frame containing non-selected lines on which trial shifts are not performed.

9. The machine according to claim 8 wherein the number of selected individual lines is fewer than five.

10. The machine according to claim 9 wherein the number of selected individual lines is 3.

11. The machine according to claim 8 wherein the majority of the trial shifts have a larger horizontal component than vertical component.

12. The machine according to claim 11 wherein the vertical component is zero.

13. The machine according to claim 8 wherein the computer processor, is configured to execute the instructions so as to identify the shift that produces the measure indicative of the greatest similarity and at least one other shift that corresponds to a local maximum of similarity as indicated by the measure.

14. A machine according to claim 8, wherein the selected individual lines of pixels of the first video frame divide the first video frame into equal parts.

15. A machine configured to estimate a global motion vector for a first video frame of a video sequence comprising at least a first and a second video frame, wherein said global motion vector identifies a shift that when applied to a second video frame increases the similarity between the first and second video frames, the machine comprising:
- a non-transitory computer-readable storage medium storing instructions;
- a computer processor, configured to execute the instructions so as to:
  - select pixels directly from the first video frame so that the selected pixels are selected only from selected individual lines of pixels of the first video frame and comprise a set of contiguous pixels taken from a portion of each selected line of pixels and the number of selected individual lines is less than 5% of the total number of lines in the first video frame;
  - compare the selected pixels with correspondingly positioned pixels of the second video frame to produce a measure of similarity corresponding to zero shift;
  - compare, for each of a plurality of trial shifts, the selected pixels with pixels of the second video frame that have the same mutual positions but shifted by the respective trial shift, to produce a measure of similarity in respect of that trial shift;
  - identify one of the trial or zero shifts that corresponds to the highest measure of similarity, the highest measure of similarity being determined by calculating a lowest sum of absolute differences in luminance between the selected pixels of the first frame with the pixels of the second video frame that have the same mutual positions but shifted by the respective trial shift for all selected individual lines; and
  - estimate the global motion vector from the identified shift,
  - wherein each selected individual line of pixels separates parts of the first video frame containing non-selected lines on which trial shifts are not performed.

16. A machine according to claim 15, wherein the selected individual lines of pixels of the first video frame divide the first video frame into equal parts.

* * * * *